United States Patent
Alexandrov et al.

(10) Patent No.: US 8,872,426 B2
(45) Date of Patent: Oct. 28, 2014

(54) ARRANGEMENTS AND METHODS FOR TRIAC DIMMING OF GAS DISCHARGE LAMPS POWERED BY ELECTRONIC BALLASTS

(71) Applicant: Lucidity Lights, Inc., Cambridge, MA (US)

(72) Inventors: Felix I. Alexandrov, Bedford, MA (US); James N. Lester, Essex, MA (US); Jakob Maya, Brookline, MA (US)

(73) Assignee: Lucidity Lights, Inc., Cambridge, MA (US)

( * ) Notice: Subject to any disclaimer, the term of this patent is extended or adjusted under 35 U.S.C. 154(b) by 59 days.

(21) Appl. No.: 13/684,660

(22) Filed: Nov. 26, 2012

(65) Prior Publication Data
US 2014/0145613 A1 May 29, 2014

(51) Int. Cl.
H05B 41/14 (2006.01)
H05B 41/38 (2006.01)

(52) U.S. Cl.
CPC ..................... *H05B 41/38* (2013.01)
USPC ....... 315/85; 315/307; 315/200 R; 315/227 R

(58) Field of Classification Search
USPC ............ 315/85, 246, 227 R, 200 R, 273, 291, 315/307
See application file for complete search history.

(56) References Cited

U.S. PATENT DOCUMENTS

| | | |
|---|---|---|
| 3,521,120 A | 7/1970 | Anderson |
| 4,010,400 A | 3/1977 | Hollister |
| 4,219,760 A | 8/1980 | Ferro |
| 4,568,859 A | 2/1986 | Houkes et al. |
| 4,710,678 A | 12/1987 | Houkes et al. |
| 4,727,294 A | 2/1988 | Houkes et al. |
| 4,977,354 A | 12/1990 | Bergervoet et al. |
| 5,239,238 A | 8/1993 | Bergervoet et al. |
| 5,325,018 A | 6/1994 | El-Hamamsy |

(Continued)

FOREIGN PATENT DOCUMENTS

| | | |
|---|---|---|
| EP | 1705691 A1 | 9/2006 |
| EP | 2421335 A1 | 2/2012 |

(Continued)

OTHER PUBLICATIONS

ANSI, "American National Standard—for electric lamps, A,G,PS, and Similar Shapes with E26 Medium Screw Bases", ANSI C78.20-2003, 2003, 48 pages.

(Continued)

*Primary Examiner* — Don Le
(74) *Attorney, Agent, or Firm* — GTC Law Group LLP & Affiliates

(57) ABSTRACT

An apparatus for powering and TRIAC dimming of a gas discharge lamp includes an electronic ballast for powering a gas discharge lamp from a TRIAC based dimmer connected to an AC line, an EMI filter for protecting the AC line from EMI generated by the ballast and the lamp, a DC bus without a smoothing electrolytic capacitor, a resonant DC-to-AC inverter connected to the DC bus for powering the gas discharge lamp with a high frequency current, wherein an auxiliary DC-to-DC power supply input is connected to the DC bus and a first resonant tank having in series a first resonant inductor and a first resonant capacitor, wherein the gas discharge lamp is connected in parallel to the resonant capacitor.

20 Claims, 7 Drawing Sheets

(56) References Cited

U.S. PATENT DOCUMENTS

| | | |
|---|---|---|
| 5,387,850 A | 2/1995 | Bray et al. |
| 5,404,082 A | 4/1995 | Hernandez et al. |
| 5,412,280 A | 5/1995 | Scott et al. |
| 5,434,482 A | 7/1995 | Borowiec et al. |
| 5,446,350 A | 8/1995 | El-Hamamsy et al. |
| 5,461,284 A | 10/1995 | Roberts et al. |
| 5,465,028 A | 11/1995 | Antonis et al. |
| 5,598,069 A | 1/1997 | Van et al. |
| 5,604,411 A * | 2/1997 | Venkitasubrahmanian et al. ............... 315/307 |
| 5,621,266 A | 4/1997 | Popov et al. |
| 5,789,855 A | 8/1998 | Forsdyke et al. |
| 5,796,214 A | 8/1998 | Nerone |
| 5,808,414 A | 9/1998 | Wharmby et al. |
| 5,834,905 A | 11/1998 | Godyak et al. |
| 5,841,229 A | 11/1998 | Borowiec et al. |
| 5,866,991 A | 2/1999 | Farkas et al. |
| 5,872,429 A * | 2/1999 | Xia et al. ............... 315/194 |
| 5,886,472 A | 3/1999 | Alexandrovich et al. |
| 5,952,792 A | 9/1999 | Borowiec et al. |
| 5,994,848 A | 11/1999 | Janczak |
| 6,084,359 A | 7/2000 | Hetzel et al. |
| D443,703 S | 6/2001 | Sood |
| 6,288,490 B1 | 9/2001 | Popov |
| 6,348,767 B1 | 2/2002 | Chen et al. |
| 6,392,366 B1 | 5/2002 | Nerone |
| 6,433,493 B1 | 8/2002 | Ilyes et al. |
| D506,840 S | 6/2005 | Ven et al. |
| 7,049,763 B2 | 5/2006 | Hochi et al. |
| D528,674 S | 9/2006 | Gonzalez |
| 7,119,486 B2 | 10/2006 | Godyak et al. |
| 7,180,230 B2 | 2/2007 | Godyak et al. |
| D538,953 S | 3/2007 | Mama |
| D540,961 S | 4/2007 | Hrubowchak et al. |
| D550,864 S | 9/2007 | Hernandez, Jr. et al. |
| 7,459,856 B1 | 12/2008 | Wursching et al. |
| 7,753,558 B2 | 7/2010 | Ribarich |
| 7,812,544 B2 | 10/2010 | Morales et al. |
| 7,822,514 B1 | 10/2010 | Erickson |
| 8,035,318 B2 | 10/2011 | Bobel |
| 2005/0122057 A1* | 6/2005 | Chen et al. ............... 315/224 |
| 2005/0280344 A1 | 12/2005 | Godyak et al. |
| 2010/0225240 A1* | 9/2010 | Shearer et al. ............... 315/247 |
| 2012/0235597 A1* | 9/2012 | Nerone ............... 315/297 |
| 2012/0286689 A1* | 11/2012 | Newman et al. ............... 315/246 |
| 2013/0033177 A1* | 2/2013 | Rooijackers et al. ............... 315/85 |
| 2014/0145591 A1 | 5/2014 | Godyak et al. |
| 2014/0145592 A1 | 5/2014 | Goscha et al. |
| 2014/0145593 A1 | 5/2014 | Goscha et al. |
| 2014/0145594 A1 | 5/2014 | Goscha et al. |
| 2014/0145595 A1 | 5/2014 | Goscha et al. |
| 2014/0145596 A1 | 5/2014 | Goscha et al. |
| 2014/0145597 A1 | 5/2014 | Goscha et al. |
| 2014/0145598 A1 | 5/2014 | Goscha et al. |
| 2014/0145599 A1 | 5/2014 | Goscha et al. |
| 2014/0145600 A1 | 5/2014 | Goscha et al. |
| 2014/0145601 A1 | 5/2014 | Goscha et al. |
| 2014/0145602 A1 | 5/2014 | Goscha et al. |
| 2014/0145603 A1 | 5/2014 | Goscha et al. |
| 2014/0145604 A1 | 5/2014 | Goscha |
| 2014/0145605 A1 | 5/2014 | Goscha et al. |
| 2014/0145606 A1 | 5/2014 | Goscha et al. |
| 2014/0145607 A1 | 5/2014 | Goscha et al. |
| 2014/0145608 A1 | 5/2014 | Goscha et al. |
| 2014/0145614 A1 | 5/2014 | Alexandrov |
| 2014/0145615 A1 | 5/2014 | Goscha et al. |
| 2014/0145616 A1 | 5/2014 | Goscha et al. |
| 2014/0145617 A1 | 5/2014 | Goscha et al. |
| 2014/0145618 A1 | 5/2014 | Goscha et al. |
| 2014/0145619 A1 | 5/2014 | Goscha et al. |
| 2014/0145620 A1 | 5/2014 | Goscha et al. |
| 2014/0145621 A1 | 5/2014 | Goscha et al. |
| 2014/0145637 A1 | 5/2014 | Goscha et al. |

FOREIGN PATENT DOCUMENTS

| | | |
|---|---|---|
| IN | 244771 | 5/2013 |
| JP | 2006-54054 A | 2/2006 |
| JP | 2009-104981 A | 5/2009 |
| WO | 2014082039 A1 | 5/2014 |

OTHER PUBLICATIONS

ANSI, "American National Standard—for electric lamps, PAR and R Shapes", ANSI C78.21-2003, 2003, 48 pages.

Nerone, Louis R., "A Novel Ballast for Electrodeless Fluorescent Lamps", Conference Record of the 2000 IEEE Industry Applications Conference, vol. 5, 2000, pp. 3330-3337.

M9711465-0001, DE Design Application No. M9711465-0001, titled "Fluorescent lamp", filed Dec. 11, 1997, Toshiba Lightec KK, and as shown on p. 3457 in the German Design Gazette that issued on Sep. 10, 1998, 5 pages.

PCT/US2013/071709, "International Application Serial No. PCT/US2013/071709, International Search Report and Written Opinion mailed Mar. 26, 2014", Lucidity Lights, Inc., 22 pages.

* cited by examiner

ARRANGEMENTS AND METHODS FOR TRIAC DIMMING OF GAS DISCHARGE LAMPS POWERED BY ELECTRONIC BALLASTS

BACKGROUND

1. Field

This invention relates to electronic ballasts, and more particularly for single stage ballasts and TRIAC dimmable high frequency electrodeless lamps.

2. Description of Related Art

Phase controlled TRIAC dimmers are commonly used for dimming incandescent lamps. TRIAC is a bidirectional gate controlled switch that may be incorporated in a wall dimmer. A typical dimmer circuit with an incandescent lamp is shown in FIG. 1, where the TRIAC turns "on" every half of AC period. The turn "on" angle is determined by the position of the dimmer potentiometer and can vary in range from 0 to 180 degrees. Typically the lighting dimmer is combined with a wall switch. An incandescent lamp is an ideal load for a TRIAC. It provides a sufficient latching and holding current for stable turn "on" state. The TRIAC returns to its "off" state position at the AC voltage zero crossing. But wall dimmers are not capable of dimming a regular single stage ballast. These ballasts are distinguished by front-end power supplies having a rectifier bridge with an electrolytic storage capacitor. Since conduction angle of bridge rectifier is very short and holding current is not provided during the rest of the period, the TRIAC operation becomes unstable and causes lamp flickering.

Besides holding current, the TRIAC should be provided with latching current, that is a sufficient turn "on" current lasting at least 20-30 usec for latching TRIAC internal structure in stable "on" state. A ballast circuit may have an RC series circuit connected across the ballast AC terminals to accommodate the TRIAC. But steady power losses in the resistor could be significant. Other references have similar principles of operation, such as based on drawing high frequency power from the bridge rectifier. Since this power is taken from the output of the ballast the power to the lamp should be lower. The power used to support continuous rectifier bridge current should be significant to provide compatibility with actual lighting dimmers in the field.

Other previous work discloses a TRIAC dimmable electrodeless lamp without an electrolytic storage capacitor. In this case the ballast inverter input current is actually a holding current of the TRIAC and is high enough to accommodate any dimmer. The lamp ballast is built as self-oscillating inverter operating at 2.5 MHz. An example block diagram of a dimmable ballast is shown in FIG. 2. It comprises an EMI filter F connected in series with AC terminals, a Rectifier Bridge providing high ripple DC voltage to power a DC/AC resonant inverter, and a Resonant Tank loaded preferably by inductively coupled Lamp. The ballast Inverter is preferably self-oscillating Inverter operating in high frequency range (2.5-3.0 MHz). A TRIAC dimmer is connected in front of the ballast providing a cut-off phase control of input AC voltage.

Related art teaches operation from a rectified AC line live voltage that bounces from almost zero volts to about 160-170V peak. A self-oscillating inverter may start at some instant DC bus voltage, such as between 80V and 160V, but it will stop oscillating at lower voltage (usually in a range between 20V and 30V). FIG. 3 illustrates a related art dimming method where Vm 302 is a voltage waveform after the TRIAC dimmer. This voltage is rectified and applied to the input of the inverter. Without an electrolytic storage capacitor, the ballast inverter (not shown in FIG. 3) stops its operation during TRIAC "off" intervals. Accordingly, electrical discharge in the lamp burner stops and starts, such as illustrated in lamp current $I_{LAMP}$ 304 in FIG. 3.

Since the recombination time in lamp gas is much shorter than the TRIAC's "off" time the lamp restarts every half period with high starting voltage and power as at regular starting. For an electrodeless 2.75 MHz, 20 W lamp starting time can be 0.8-1.0 msec. Power consumption during starting interval of the ballast could be up to 80 W because of the high power losses in the lamp and the ballast. Therefore, the dimming method illustrated in FIG. 2 is not practical because of high power stresses applied to both lamp and ballast.

Other related art discloses a TRIAC dimmed electronic ballast that utilizes a charge pump concept for an inductively coupled lamp. But unfortunately, injecting RF power in front end 60 Hz power supply is not practical because of high-level EMI injected in the front end rectifier bridge. Accordingly, the 60 Hz rectifier bridge should be built with high frequency diodes for 2.5 MHz current. Another disadvantage of the concept is that, during lamp starting, a significant portion of RF transient power is taken from the ballast output to the charge pump. It may prevent the lamp from starting.

TRIAC dimmed electronic ballasts with a power charge pump feature a variable DC bus voltage resulting in lamp dimming. The charge pump requires high voltage bulk electrolytic capacitor connected to DC bus. Capacitor dimensions become a problem when the RF ballast is integrated in the lamp. Therefore, TRIAC dimming of high frequency ballast without electrolytic DC bus capacitor looks more attractive for RF ballast. But the restarting disadvantage mentioned above does not allow for practical implementation. Therefore, there is a need for other solutions for dimming high frequency electrodeless lamps.

SUMMARY

In accordance with an exemplary and non-limiting embodiment, a method for dimming a gas discharge lamp with a wall dimmer is provided. The method may provide uninterruptible operation of the lamp and the ballast during TRIAC dimming. The method may include powering the ballast without electrolytic smoothing capacitor, directly from rectified AC voltage that is chopped by the TRIAC dimmer and supporting lamp operation during off time of the TRIAC, such as with a smoothing electrolytic capacitor-less D.C. bus. Implementation of the method may include additional features comprising charging a small low voltage capacitor from the DC bus via a DC to DC step down current limiting converter during the TRIAC turn "on" intervals and discharging this capacitor directly to DC bus during TRIAC turn "off" intervals, for maintaining uninterruptable current in the gas discharge lamp.

In another aspect, the invention may feature a DC current charge circuit for charging low voltage capacitor. In one of disclosure embodiments the charger may be built as charge pump connected to the output of ballast resonant inverter.

In the other aspect, for dimming of inductively coupled lamps, the invention may feature a secondary series resonant tank stepping down DC bus voltage for charging a low voltage capacitor. The secondary resonant tank may be coupled to the switching transistors of the ballast resonant inverter.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While described in connection with certain exemplary and non-limiting embodiments, other exemplary embodiments would be understood by one of ordinary skill in the art and are encompassed herein. It is therefore understood that, as used herein, all references to an "embodiment" or "embodiments" refer to an exemplary and non-limiting embodiment or embodiments, respectively.

DETAILED DESCRIPTION

Figure 4:
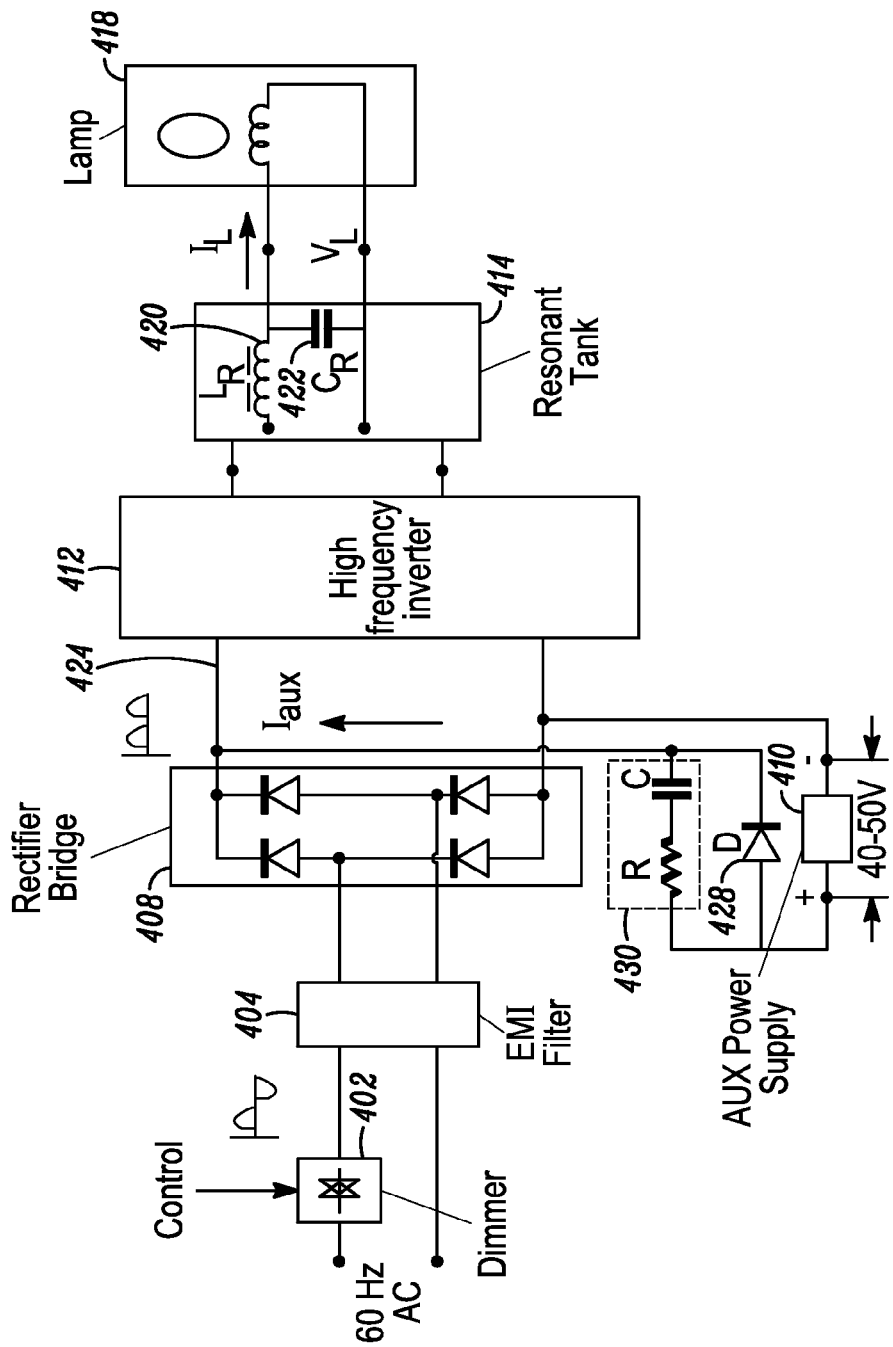
FIG. 4 shows a block diagram of an electronic ballast with a dimming arrangement in accordance with the present invention.

FIG. 4 shows block-circuit diagram of an electronic ballast connected to a TRIAC dimmer 402. The dimmer 402 may be for instance, a wall dimmer aimed for controlling incandescent lamps. The electronic ballast may feature a front-end power supply without a traditional smoothing capacitor, such as with a smoothing electrolytic capacitor-less D.C. bus. It may comprise an EMI filter 404, a Bridge Rectifier 408, a high frequency Inverter 412 (e.g. a 2.5 MHz inverter), and resonant load that includes Resonant Tank 414 and electrodeless Lamp 418. In accordance with exemplary and non-limiting embodiments, the high frequency inverter may be selected to operate at a very wide frequency range such as tens of KHz to many hundreds of MHz. The Resonant Tank 414 may utilize a series resonant circuit having resonant inductor LR 420 and resonant capacitor CR 422 with the Lamp 418 connected in parallel with the resonant capacitor CR 422. An auxiliary low voltage (40-50V) DC power supply 410 may be connected to the DC bus 424 of the inverter via a backup diode D 428 for filling in rectified voltage valleys. The power supply 410 may be built as a DC-to-DC step down converter powered from the DC bus 424. The auxiliary DC power supply 410 may comprise a small low voltage storage capacitor (may be electrolytic or tantalum type) for maintaining uninterruptable low power lamp operation during the TRIAC "off" time intervals. The R-C network 430 may be connected across the diode D 428 for providing latching current pulse of very short duration (20-40 usec) to the TRIAC after its triggering. By having low voltage power supply 410 (40-50V or even lower), a wider dimming range may be achieved.

Figure 1:
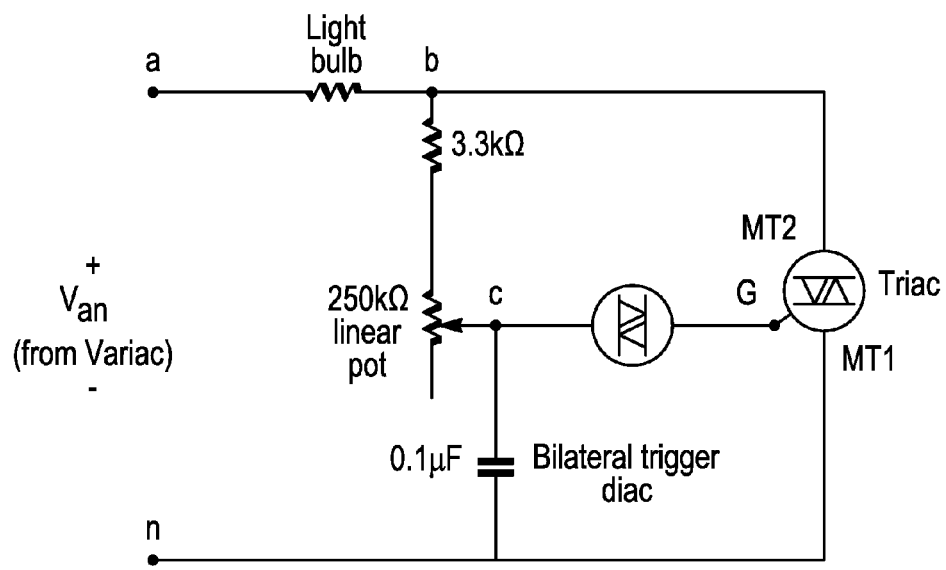
FIG. 1 shows a typical circuit diagram of a TRIAC based dimmer known in the art.
Figure 2:
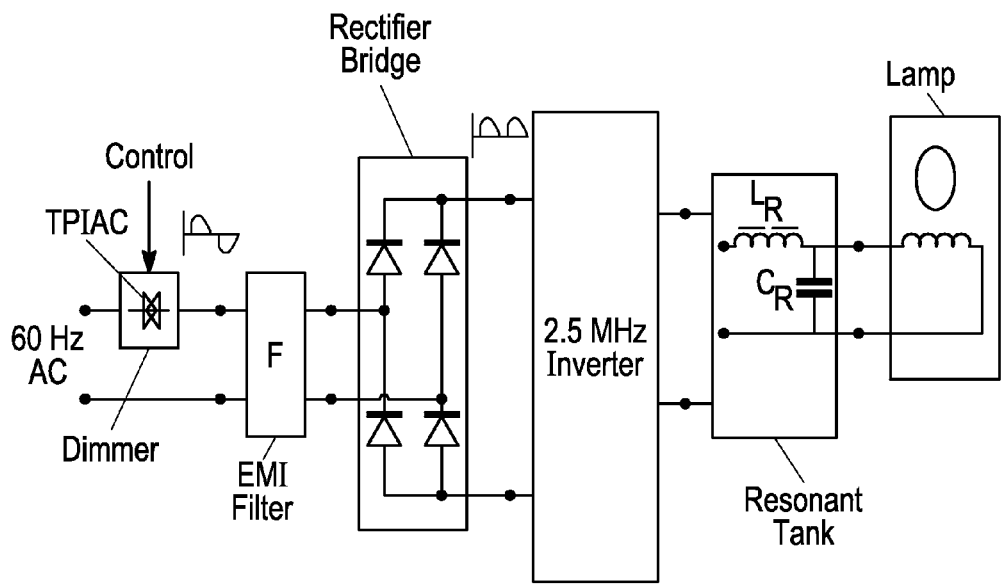
FIG. 2 shows a block diagram of an electronic ballast without electrolytic smoothing capacitor known in the art.
Figure 3:
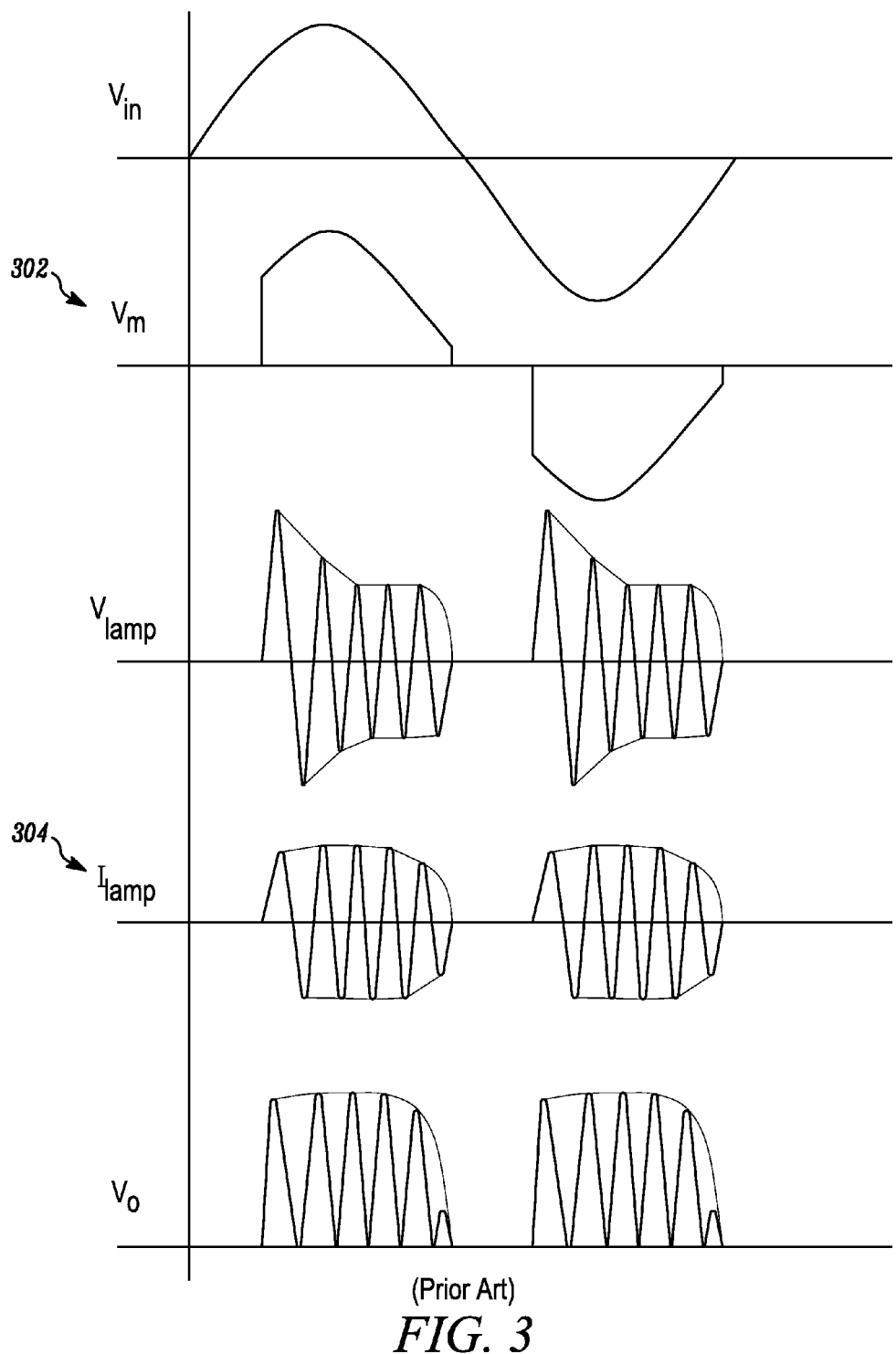
FIG. 3 illustrates dimming operation of the electronic ballast known in the art.
Figure 5:
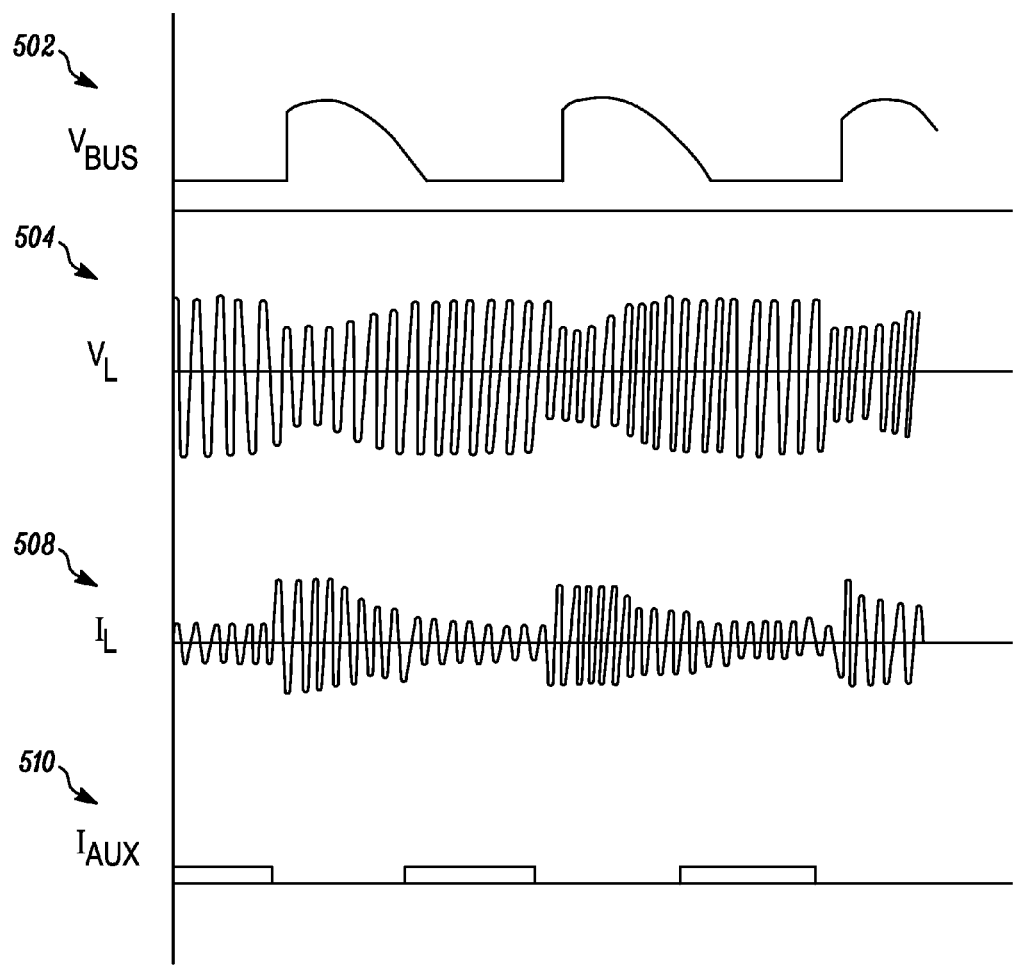
FIG. 5 illustrates the ballast and lamp operation method in accordance with an exemplary embodiment.

In FIG. 5, dimming operation of the lamp and ballast of FIG. 4 is illustrated by showing wave forms of the DC bus voltage $V_{BUS}$ 502, Lamp voltage $V_L$ 504, Lamp current $I_L$ 508, and auxiliary power supply current $I_{AUX}$ 510. In comparison with the prior art method demonstrated in FIG. 2, the lamp current continues during TRIAC "off" intervals, so that the ballast and the lamp do not need to restart. To keep the Lamp "on" at minimum current only 15-20% of nominal lamp power may be needed. This power may be obtained from an external or internal DC source.

In accordance with exemplary and non-limiting embodiments a method for a dimming gas discharge lamp powered by an electronic ballast with a front-end power supply without an electrolytic smoothing capacitor is provided. Said method may feature uninterruptible lamp operation and comprises steps of charging a low voltage storage capacitor during TRIAC "on" time intervals and discharging said low voltage storage capacitor to the DC bus during TRIAC "off" time intervals. Since the low voltage storage capacitor for supporting lamp operation is at a minimum consumption of power, its dimensions may be a few times less than the same for a storage capacitor in the prior art dimmed ballasts with boosting voltage charge pumps. Since auxiliary voltage $V_{AUX}$ may not exceed 50V, a miniature tantalum capacitor may be used in the ballast.

Figure 6:
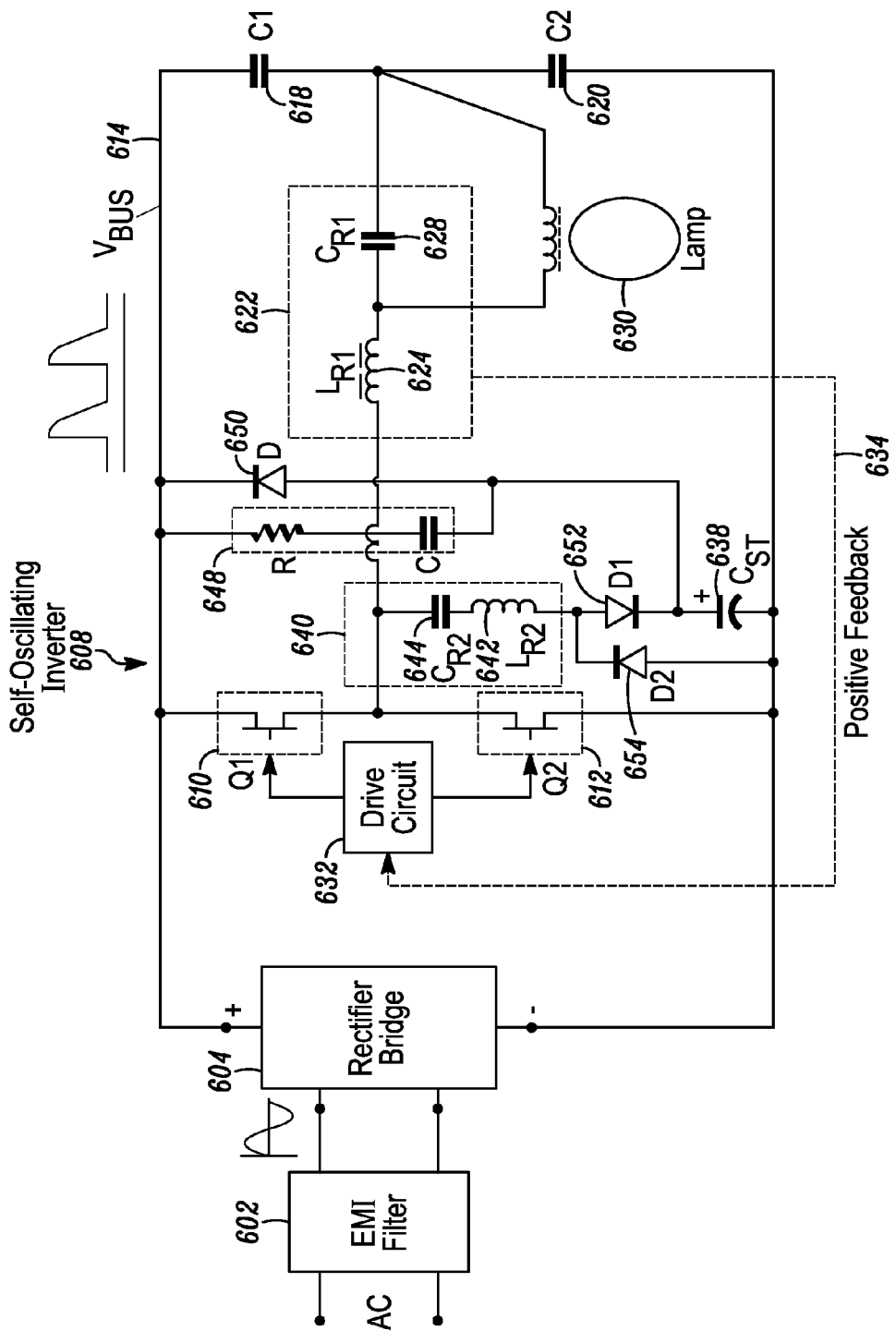
FIG. 6 shows a block-schematic diagram of the TRIAC dimmed ballast according to an exemplary embodiment.

In accordance with exemplary and non-limiting embodiments an electronic ballast is provided without an electrolytic DC bus smoothing capacitor. FIG. 6 illustrates a block-circuit diagram in an embodiment of the disclosure, preferably for RF electronic ballasts. It may comprise a ballast connected to a TRIAC dimmer (not shown). The ballast front-end power supply may comprise an EMI filter 602 and a rectifier bridge 604. There may not be a traditional electrolytic capacitor connected in parallel to the output of the rectifier bridge 604. A self-oscillating inverter 608 may be built with a half bridge topology but other relevant inverter topologies may also be used. The inverter 608 may comprise a pair of series MOSFET switching transistors Q1 610 and Q2 612, connected across DC bus 614, a capacitive divider with capacitors C1 618 and C2 620 across the DC bus 614, a first, parallel loaded resonant tank 622 having a first series resonant inductor LR1 624 and a first resonant capacitor CR1 628. Inductively coupled Lamp 630 may be connected in parallel to the first resonant capacitor CR1 628. Transistors Q1 610 and Q2 612 may be driven by a drive circuit 632 coupled to the inverter 608 via a positive feedback 634 circuit (not shown), for self-excitation of the inverter 608.

In accordance with exemplary and non-limiting embodiments, FIG. 6 shows the auxiliary power supply combined with the inverter power stages, comprising the transistors Q1 610 and Q2 612. The inverter 608 may include a low voltage storage capacitor $C_{ST}$ 638 having a positive terminal connected to DC bus 614 via a backup diode D 650 and a negative terminal connected to DC bus negative terminal. The inverter 608 may also feature a second, series loaded, current limiting resonant tank 640 comprising a second resonant inductor LR2 642 and a second resonant capacitor CR2 644. A secondary high frequency rectifier having diodes D1 652 and D2 654 may be connected in series with the indictor LR2 642 and capacitor CR2 644. Rectified current charges the storage capacitor $C_{ST}$ 638. A ceramic bypass capacitor (not shown) may be connected in parallel to the storage capacitor $C_{ST}$ 638 for RF application. The power of the second resonant circuit may be much less than the first one, so that a tiny Schottky diode array, for instance, BAS70-04 may be used in the secondary rectifier circuit. An RC-network 648 may be connected across the diode 650 for conditioning the external TRIAC dimmer. In the ballast of FIG. 6, the storage capacitor $C_{ST}$ 638 may have much less energy storage than a traditional DC bus high voltage capacitor, where its rated voltage may be about 50V. The low voltage storage capacitor $C_{ST}$ 638 may have much smaller dimensions than the traditional high voltage DC bus capacitor in prior art ballasts.

Figure 7:
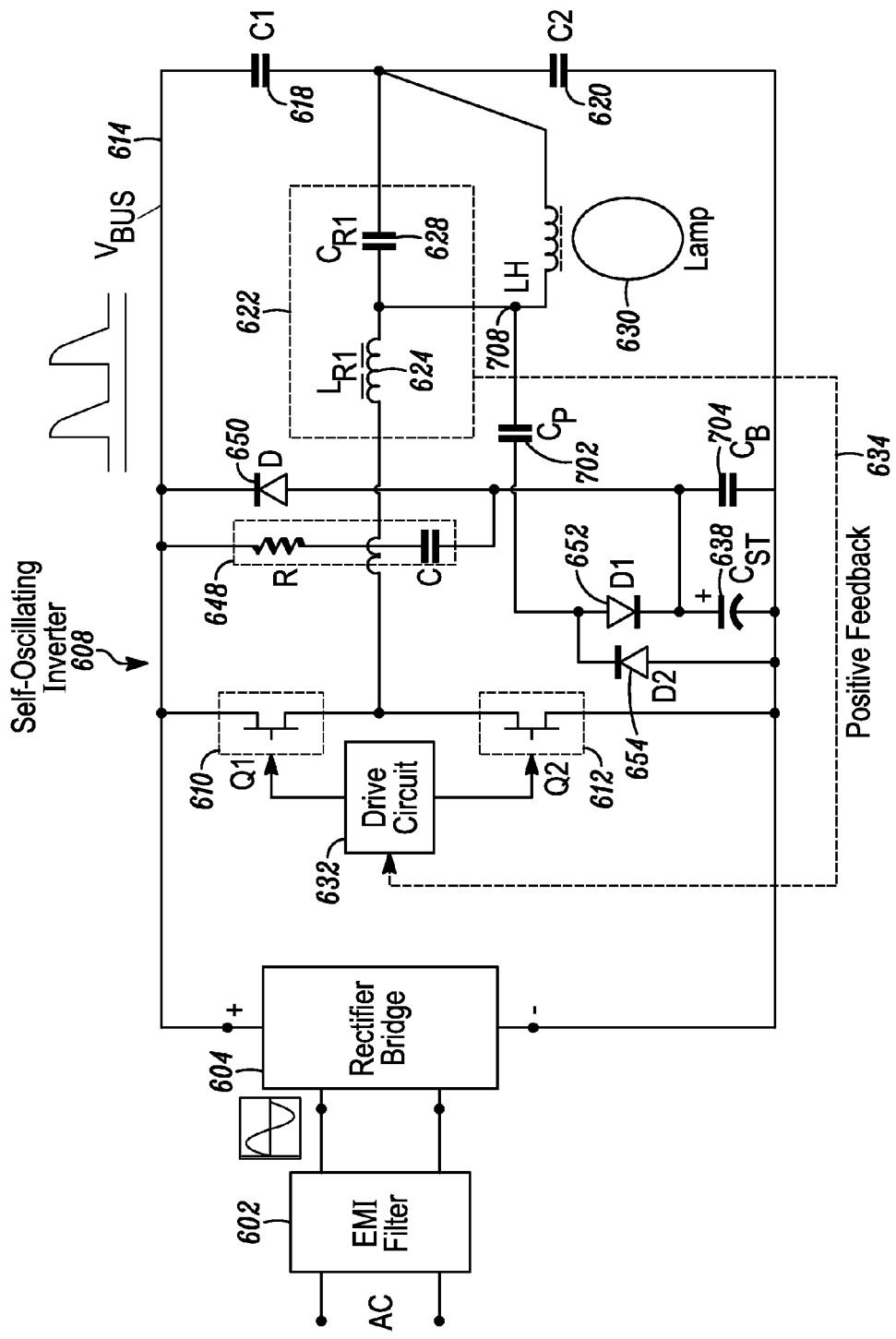
FIG. 7 shows a block-circuit diagram according to an exemplary embodiment.

In accordance with exemplary and non-limiting embodiments, FIG. 7 demonstrates another low cost configuration. This embodiment differs from that presented in FIG. 6 by the way in which the storage capacitor $C_{ST}$ 638 is charged. In the inverter 608 of FIG. 7 $C_{ST}$ 638 is charged by a charge pump from the inverter output. A series capacitor Cp 702 is connected between the inverter high voltage terminal LH 708 and the diode configuration of D1 652 and D2 654. Charge current is determined by value of capacitor Cp 702. A bypass capacitor $C_B$ 704 may be connected across the storage capacitor $C_{ST}$ 638.

Comparatively, the arrangement in FIG. 7 may provide faster low voltage capacitor $C_{ST}$ 638 charging during lamp starting. But it may slow down the starting process of an electrodeless lamp by taking out power from the lamp and returning said power to the inverter input. Also, this power feedback may cause system stability problems during steady-state system operation because of the lamp negative impedance.

The additional component LR2 642 in FIG. 6 may provide full decoupling from resonant load and the lamp. It may provide a reliable starting and high efficiency due to step down feature of the series load connection. To help guarantee a Zero Voltage Switching (ZVS) the second resonant tank should operate in inductive mode, such as when $\omega LR2>1/\omega CR2$. In an example, for a 20 W electrodeless lamp operating at 2.75 MHz, the values of secondary resonant circuit components may be the following: LR2=150 uH, CR2=18 pF; Schottky diode array BAS70-04, electrolytic capacitor $C_{ST}$=22 uF, 50V. A bypass capacitor 0.1 uF is connected across the electrolytic capacitor $C_{ST}$.

The lamp may be dimmed because of a variation of RMS voltage applied to the lamp, with a condition that the minimum required lamp current is sustained. Some minimum DC bus voltage should be provided to ensure continuous ballast-lamp operation. During TRIAC dimming both the TRIAC formed voltage and DC backup voltage may vary and cause lamp dimming. The lower the minimum backup voltage the wider is the dimming range. This minimum voltage depends on many factors determined by lamp and ballast or combination of both characteristics. For a 2.5 MHz electrodeless Lamp minimum operation voltage for continuation of burning may be about 38-40V at 20C ambient temperature.

Figure 8:
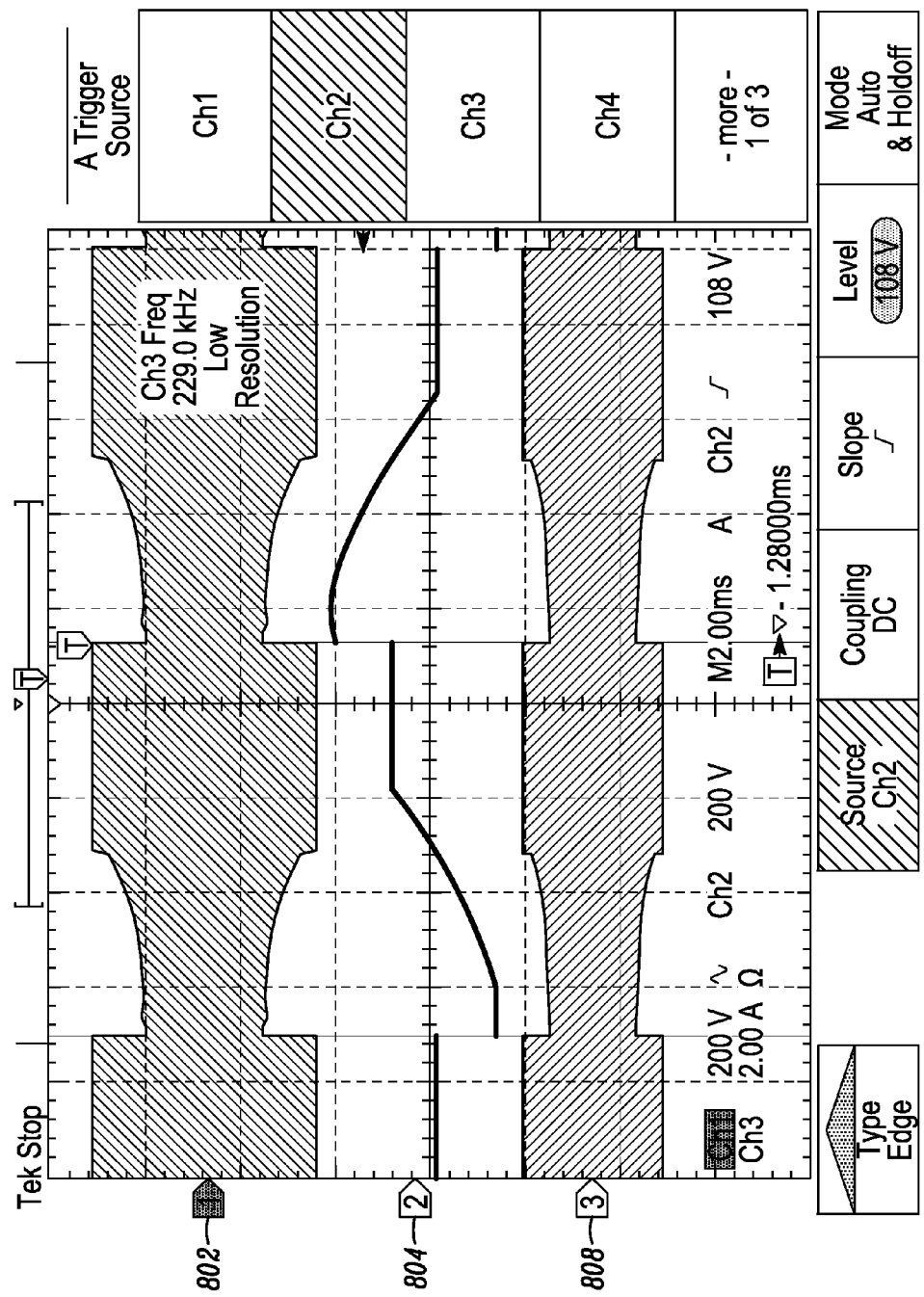
FIG. 8 shows oscillograms of the TRIAC voltage, lamp current and lamp voltage in a dimming mode, according to an exemplary embodiment.

FIG. 8 shows actual oscillograms taken from an experimental dimming of a 20 W, 2.75 MHz electrodeless Lamp with a TRIAC dimmer. Ch2 804 shows TRIAC voltage, Ch1 802 shows lamp voltage, and Ch3 808 shows lamp current. The backup DC voltage is about 45V. As can be seen the lamp and ballast operate continuously with the TRIAC dimmer. In this example, the lamp is dimmed to 60% of the output power.

At low bus voltage, lamp voltage (Ch1) is increased, since the gas discharge is characterized by negative impedance. Inductively coupled lamps are distinguished by a significant leakage inductance. That is why lamp voltage increases correspondingly with lamp current (Ch3).

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

All documents referenced herein are hereby incorporated by reference.

What is claimed is:

1. An apparatus for powering and TRIAC dimming of a gas discharge lamp comprising:
    an electronic ballast for powering a gas discharge lamp from a TRIAC based dimmer connected to an AC line;
    an EMI filter for protecting the AC line from EMI generated by the ballast and the lamp;
    a DC bus without a smoothing electrolytic capacitor;
    a resonant DC-to-AC inverter connected to the DC bus for powering the gas discharge lamp with a high frequency current, wherein an auxiliary DC-to-DC power supply input is connected to the DC bus; and
    a first resonant tank having in series a first resonant inductor and a first resonant capacitor, wherein the gas discharge lamp is connected in parallel to the resonant capacitor.

2. The apparatus of claim 1, wherein the auxiliary DC-to-DC power supply's instant voltage is kept within the range of 40-50V.

3. The apparatus of claim 1, wherein a series RC circuit is connected in parallel to a backup diode, the parallel RC circuit and backup diode connected in series with the auxiliary DC-to-DC power supply.

4. The apparatus of claim 1 wherein the auxiliary DC-to-DC power supply is a step-down power supply coupled to the DC bus.

5. The apparatus of claim 1, wherein the auxiliary power supply comprises a second resonant tank and a rectification circuit connected in parallel to the first resonant tank.

6. An apparatus for powering and TRIAC dimming of a gas discharge lamp comprising:
    an electronic ballast for powering a gas discharge lamp from a TRIAC based dimmer connected to an AC line;
    an EMI filter for protecting the AC line from EMI generated by the ballast and the lamp;
    a DC bus without a smoothing electrolytic capacitor;
    a resonant DC-to-AC inverter connected to the DC bus for powering the gas discharge lamp with a high frequency current, wherein an auxiliary DC-to-DC power supply input is connected to the DC bus;
    a first resonant tank having in series a first resonant inductor and a first resonant capacitor, wherein the gas discharge lamp is connected in parallel with the resonant capacitor
    a second resonant inductor;
    a second resonant capacitor connected in series with the second resonant inductor;
    a DC load connected in series with the second resonant capacitor via a rectification circuit for providing an auxiliary DC power supply output; and a charge pump with two diodes and a low voltage storage capacitor, connected in series with the second resonant inductor and the second resonant capacitor.

7. The apparatus of claim 6, wherein the auxiliary DC-to-DC power supply's instant voltage is kept within the range of 40-50V.

8. The apparatus of claim 6, wherein a series RC circuit is connected in parallel to a backup diode, the parallel RC circuit and backup diode connected in series with the auxiliary DC-to-DC power supply.

9. The apparatus of claim 6 wherein the auxiliary DC-to-DC power supply is a step-down power supply coupled to the DC bus.

10. The apparatus of claim 6, wherein the auxiliary power supply comprises a second resonant tank and a rectification circuit connected in parallel to the first resonant tank.

11. The apparatus of claim 10, further comprising:
a second charge pump circuit connected between an inverter output high voltage terminal and a DC bus terminal,
a charge pump capacitor connected to a second rectification circuit having two diodes and a low voltage storage capacitor.

12. The apparatus of claim 6 further comprising a half bridge resonant inverter having two series dividing capacitors connected to the DC bus and a gas discharge lamp first terminal connected to the common junction of dividing capacitors and the second resonant tank connected between the common junction of dividing capacitors and a DC bus terminal.

13. A method for dimming gas discharge lamps, comprising:
powering a lamp ballast from a rectified AC main voltage chopped by a TRIAC dimming circuit;
charging at least one low voltage electrolytic capacitor separated from the input of the ballast during TRIAC on-time intervals; and
discharging the at least one capacitor to inverter input during TRIAC off-time intervals, for supplying continuous lamp current during such TRIAC off-time intervals.

14. A system, comprising:
a gas discharge light source that is dimmable from an external TRIAC dimming circuit having uninterruptable operation of the light source and an associated ballast, wherein the ballast is powered without an electrolytic smoothing capacitor directly from a rectified AC main voltage chopped by the triac dimming circuit.

15. The system of claim 14, wherein a small low voltage capacitor is charged by a step-down converter during the on intervals of the triac dimming circuit and discharging the capacitor during the off-intervals of the triac dimming circuit.

16. The system of claim 14, wherein a DC current charge circuit is provided for charging a low voltage capacitor, where the charger is a charge pump connected to the output of a resonant inverter of the ballast.

17. The system of claim 14, wherein a secondary series resonant tank is utilized for charging a low voltage capacitor.

18. The system of claim 17, wherein a stepped-down DC bus voltage is used with the secondary series resonant tank for charging the low voltage capacitor.

19. The system of claim 14, wherein the secondary resonant tank is coupled to a switching transistor of a ballast resonant inverter.

20. An apparatus, comprising:
an electrodeless gas discharge lamp powered from an electronic ballast comprising a low power auxiliary DC power supply connected to a DC bus of a ballast inverter, wherein the electrodeless gas discharge lamp is adapted to be dimmable by a TRIAC dimmer system that is connected to an AC input of the electronic ballast.

* * * * *